United States Patent
Nam et al.

(10) Patent No.: US 7,039,535 B2
(45) Date of Patent: May 2, 2006

(54) APPARATUS AND METHOD FOR ANALYSIS OF ELECTRIC POWER TRANSMISSION LINK STATUS HAVING FUNCTION OF REAL-TIME EVALUATING THERMAL PARAMETERS OUTSIDE THE LINK

(75) Inventors: Seok-Hyun Nam, Gyeonggi-do (KR); Su-Kil Lee, Gyeonggi-do (KR); Duk-Jin Oh, Gyeonggi-do (KR)

(73) Assignee: L.G. Cable Ltd., Seoul (KR)

( * ) Notice: Subject to any disclaimer, the term of this patent is extended or adjusted under 35 U.S.C. 154(b) by 0 days.

(21) Appl. No.: 10/831,560

(22) Filed: Apr. 23, 2004

(65) Prior Publication Data

US 2005/0125174 A1   Jun. 9, 2005

(30) Foreign Application Priority Data

Dec. 4, 2003   (KR) .................. 10-2003-0087725

(51) Int. Cl.
*G06F 19/00* (2006.01)
*G06F 1/26* (2006.01)
*H02H 5/04* (2006.01)

(52) U.S. Cl. ............... 702/65; 324/106; 361/93.8; 702/64; 702/130; 713/330

(58) Field of Classification Search ........... 702/64, 702/65, 130, 132, 133, 136; 374/44; 361/93.8; 324/106, 127; 307/64; 340/870.17, 870.28; 713/330

See application file for complete search history.

(56) References Cited

U.S. PATENT DOCUMENTS

| 4,847,780 | A | * | 7/1989 | Gilker et al. ............... 702/64 |
| 4,886,980 | A | * | 12/1989 | Fernandes et al. ........... 307/64 |
| 5,140,257 | A | * | 8/1992 | Davis ....................... 324/106 |
| 5,181,026 | A | * | 1/1993 | Granville ................ 340/870.28 |
| 6,167,525 | A |   | 12/2000 | Donazzi et al. ............. 713/330 |

FOREIGN PATENT DOCUMENTS

KR   2001-10822   8/2001

* cited by examiner

*Primary Examiner*—John Barlow
*Assistant Examiner*—John H. Le
(74) *Attorney, Agent, or Firm*—Jones Day

(57) ABSTRACT

Apparatus and method for real-time analysis of an electric power transmission link status direct buried or installed in a duct or a tunnel are described. The method includes: real-time measuring a surface distributed temperature of the link by using a distributed temperature sensor installed along a longitudinal direction of the link; calculating a conductor temperature of the link on the basis of the surface distributed temperature and an electric current flowing through the link; calculating a heat flow emitted out of the link on the basis of the surface distributed temperature and the conductor temperature; and real-time calculating a thermal parameter of an environment around the link on the basis of the heat flow. Thus, it is possible to calculate operating conditions of the link more accurately and improve safety of electric power transmission by real-time calculating the thermal parameter of the environment around the link.

19 Claims, 3 Drawing Sheets

APPARATUS AND METHOD FOR ANALYSIS OF ELECTRIC POWER TRANSMISSION LINK STATUS HAVING FUNCTION OF REAL-TIME EVALUATING THERMAL PARAMETERS OUTSIDE THE LINK

BACKGROUND OF THE INVENTION

1. Field of the Invention

The present invention relates to apparatus and method for analysis of an electric power transmission link status, and more particularly apparatus and method for real-time analysis of an electric power transmission link status, which has a function of calculating and displaying thermal resistance and thermal capacity of environment around an installed electric power transmission link.

2. Description of the Related Art

The term 'electric power transmission link' used in this specification and appended claims is defined to include cables, joints and branches used for transmitting electric power from a supplier (e.g., a power generator, a transformer substation and a power distribution station) to a consumer (e.g., a transformer substation, a power distribution station and a final user such as a building or a house), and referred to as 'a link' hereinafter.

The link sensitively responds to the change of environment such as temperature around a spot where the link is buried or temporarily installed, so such a change of environment significantly affects on transmission capacity and stability of the link. Particularly, the transmission capacity and capacity of the link installed under the ground are seriously influenced by a thermal parameter, namely thermal resistance and thermal capacity. The electric power transmission of the link generates heat, and this heat causes moisture in the surrounding soil to be moved, thereby increasing the thermal resistance. The increase of thermal resistance caused by the work of the link limits the electric current acceptable to the link to an extreme level. Thus, operating the link without consciousness of the increase of thermal resistance may lead to a critical accident such as thermal breakdown or firing.

In the present, as disclosed in Korean Patent Laid-open Publication No. 2001-79444 or U.S. Pat. No. 6,167,525, there are some attempts to prevent such a critical accident. For example, after measuring temperature of the outer surface of the link or outside of the insulating material along the longitudinal direction of the link, the temperature of a conductor in the electric power transmission cable may be calculated and informed to an operator in real time on the basis of the measured values. In addition, an ampacity (or, a current carrying capacity) acceptable to the link may be calculated on the basis of the temperature of the conductor. The calculated values in both cases are used to prevent unexpected accidents. Here, when calculating the conductor temperature or the ampacity, the thermal resistance of the soil is conventionally set to a fixed value defined by the international standard, e.g. 1 K·m/W in the temperate regions.

However, thermal resistance and thermal capacity substantially have changing values according to soil or environment around the link or an operation condition of the link, and the conventional techniques are not capable of coping with the change of such external thermal parameters. In addition, though the techniques intend to take preventive measures against any critical accident by calculating the conductor temperature in real time, they are still insufficient for preventing the critical accidents caused by the change of thermal parameters since the conductor temperature is not measured from the conductor itself but calculated on the basis of an external temperature out of the link and the fixed thermal parameters defined regardless of the current conditions.

On the other hand, there is also a way of installing a sensor for directly measuring the thermal parameters of surroundings, particularly soil. However, since the link is too long, monitoring the entire length of the link is practically impossible.

SUMMARY OF THE INVENTION

The present invention is designed to solve the problems of the prior art, and therefore it is an object of the present invention to provide apparatus and method for calculating external thermal parameters of an electric power transmission link in real time.

Another object of the invention is to provide apparatus and method for preventing a critical accident by accurately calculating a real-time transmission capacity of the electric power transmission link with the use of the external thermal parameters which are calculated in real time.

In order to accomplish the above object, the present invention provides an apparatus for analysis of an electric power transmission link status which includes a distributed temperature measuring unit installed along a longitudinal direction of an electric power transmission link directly buried or installed in a duct or a tunnel for obtaining a longitudinal distributed temperature from a distributed temperature sensor in real time; a conductor temperature calculating unit for calculating a conductor temperature of the electric power transmission link on the basis of the distributed temperature obtained by the distributed temperature measuring unit and an electric current flowing through the electric power transmission link; and an external thermal parameter calculating unit for calculating a heat flow emitted out of the electric power transmission link on the basis of the distributed temperature obtained by the distributed temperature measuring unit and the conductor temperature calculated by the conductor temperature calculating unit, and then calculating a thermal parameter of an external environment around the electric power transmission link in real time on the basis of the heat flow.

Here, the external thermal parameter calculating unit preferably calculates a thermal resistance of the external environment around the electric power transmission link either on the basis of the heat flow, the distributed temperature and a temperature of the external environment around the electric power transmission link status or on the basis of the heat flow, the distributed temperature, a temperature of the external environment around the electric power transmission link status and a thermal time constant of the external environment around the electric power transmission link.

On the other hand, the temperature of the environment around the electric power transmission link may be calculated from the distributed temperature or using a separate environment distributed temperature sensor.

In other words, the distributed temperature sensor is preferably an optical fiber distributed temperature sensor, and also preferably includes a first distributed temperature sensor installed along the longitudinal direction of the electric power transmission link and a second distributed temperature sensor installed under the ground in parallel with the first distributed temperature sensor with being constantly spaced from the first distributed temperature sensor, wherein the first distributed temperature sensor measures the distributed temperature, and the second distributed temperature measures the temperature of the external environment around the electric power transmission link.

Alternatively, the distributed temperature sensor may also be an optical fiber distributed temperature sensor forming a loop of which one side is installed along the longitudinal direction of the electric power transmission link and the other side is installed under the ground in parallel to the one side with being constantly spaced apart from the one side, wherein the distributed temperature is measured at one side of the loop, and the temperature of the external environment around the electric power transmission link is measured at the other side of the loop.

According to another aspect of the invention, there is also provided a method for analysis of an electric power transmission link status, which includes the steps of: (a) measuring a surface distributed temperature of the electric power transmission link in real time by using a distributed temperature sensor installed along a longitudinal direction of the electric power transmission link directly buried or installed in a duct or a tunnel; (b) calculating a conductor temperature of the electric power transmission link on the basis of the surface distributed temperature and an electric current flowing through the electric power transmission link; (c) calculating a heat flow emitted out of the electric power transmission link on the basis of the surface distributed temperature and the conductor temperature; and (d) calculating a thermal parameter of an external environment around the electric power transmission link in real time on the basis of the heat flow.

Using the link status analysis apparatus and method described above, it is possible to calculate more accurate transmission capacity and prevent any critical accident caused by the change of the thermal parameter of the environment by calculating the thermal parameter of the environment around the link in real time.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of this present invention will be described in detail with reference to the accompanying drawings. However, terms and vocabularies used herein should not be construed as limited to general and dictionary meanings but as based on the meanings and concepts in accordance with the spirit and scope of the invention on the basis of the principle that the inventor is allowed to define terms as the appropriate concept for the best explanation. Therefore, the description herein should not be construed as limiting the scope of the invention but as merely providing illustrations of the presented embodiments of this invention. It will be understood that other variations and modifications could be made thereto without departing from the spirit and scope of the invention.

Figure 1:
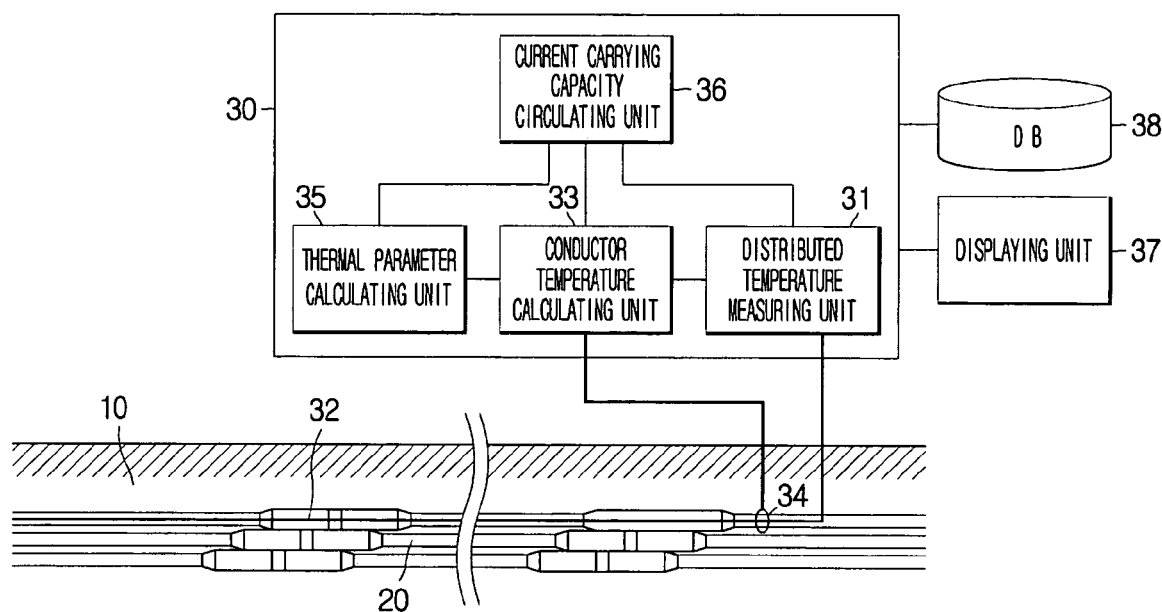
FIG. 1 is a schematic diagram showing an apparatus for analysis of an electric power transmission link status according to an embodiment of the present invention.

FIG. 1 schematically shows an apparatus for analysis of a link status according to the first embodiment of the present invention.

Referring to FIG. 1, the link status analysis apparatus 30 of this embodiment includes a distributed temperature measuring unit 31 for measuring a longitudinal distributed temperature of an electric power transmission link 20 installed under the ground by using a distributed temperature sensor 32, a conductor temperature calculating unit 33 for calculating a conductor temperature in the link on the basis of the distributed temperature and an electric current passing through the link 20, a thermal parameter calculating unit 35 for calculating a thermal parameter of an external environment (or, a soil) around the link 20 on the basis of the conductor temperature and the distributed temperature, and a current carrying capacity calculating unit 36 for calculating an ampacity (or, a current carrying capacity) acceptable to the link on the basis of the conductor temperature and the thermal parameter.

The link status analysis apparatus 30 may be realized using a computer which is capable of high-speed calculation and temporary storage, and each component 31, 33, 35 or 36 may be realized using an operation unit, a processing unit or a memory in the computer. In addition, a portion of the components 31, 33, 35 and 36, which may be expressed by an algorithm described later, may be provided as a program executable by a computer, and this program may be stored in a storage medium readable by a computer.

In addition, the link status analysis apparatus 30 may further include a displaying unit 37 for displaying a past status, a present status or a future status (namely, a status at a point of time after a predetermined period) of the link 20 to an operator, and a database 38 for storing data related to such a link status.

Now, configuration and operation of the link status analysis apparatus 30 of this embodiment and a method for analysis of a link status according to this embodiment are described in detail.

Figure 2:
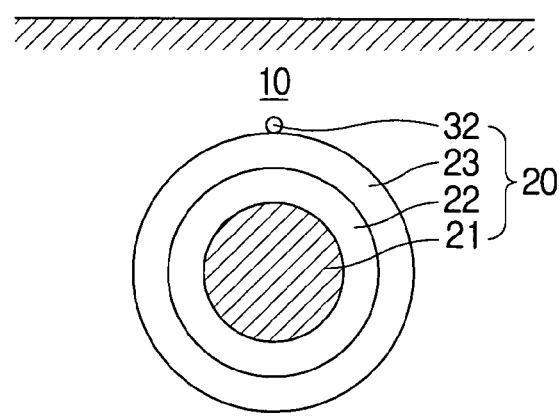
FIG. 2 is a sectional view showing an underground power cable of FIG. 1.

In the present embodiment, the distributed temperature sensor 32 is preferably an optical fiber of which one end is connected to the distributed temperature measuring unit 31. As shown in FIG. 2, the optical fiber 32 is attached to the surface of the link 20, namely the outer surface of a sheath 23. As for the optical fiber, a multi-mode optical fiber having a diameter of 50 μm/125 μm (core/cladding) and a length of 12 km or less is most preferred.

Seeing FIG. 2 which shows a simplified sectional view of the link 20, or an electric power cable, the link 20 includes a conductor 21 positioned at the center of the link 20 as a passage of an electric current, an insulation layer 22 surrounding the conductor 21, and a sheath 23 acting as a protective layer of the cable. Of course, the electric power cable in fact has more elements such as a tensile wire, excluded in the drawing for simplification.

On the other hand, though the optical fiber acting as the distributed temperature sensor 32 is depicted and described here to be attached on the surface of the sheath 23, it is also possible that the optical fiber is inserted in contact with the outer circumference of the insulation layer 22, or in contact with the inner circumference of the sheath 23. In addition, though the optical fiber is selected as the distributed temperature sensor 32 in this embodiment, it is just a preferred example, and various kinds of temperature sensors may also be adopted. When the optical fiber is substituted with another kind of temperature sensor, the number and detailed configuration of the distributed temperature measuring unit 31 may be changed according to the temperature sensor.

The distributed temperature measuring unit 31, to which one end of the optical fiber is connected, calculates a distributed temperature of the surface of the link 20 in real time throughout an entire length of link 20 where the optical fiber 32 is installed by emitting laser to the optical fiber and then detecting wavelength of a returning light. More specifically, the distributed temperature measuring unit 31 emits laser pulses having a width of several ns to several tens ns at a frequency of several kH to the optical fiber 32, and then averages temperature-dependent optical power data of Raman scattering light among the reflected laser so as to obtain temperature data. The temperature may be measured for each 1m of the link 20 with an accuracy of ±1.5° C.

The conductor temperature calculating unit 33 calculates a temperature of the conductor 21, a temperature of the insulation layer 22 and a temperature of the sheath 23 in real time on the basis of the distributed temperature of the surface of the link 20 obtained by the distributed temperature measuring unit 31 and an electric current flowing through the link 20. In addition, the thermal parameter calculating unit 35 calculates thermal parameters such as thermal resistance and/or thermal capacity of the soil 10 around the link 20 on the basis of the surface distributed temperature of the link 20, a heat flow emitted out of the link 20, and the temperature of the soil 10 around the link 20. The process of calculating the conductor temperature and the thermal parameter is now described in detail with reference to FIG. 3 showing a thermal approximate circuit diagram of the electric power cable.

Figure 3:
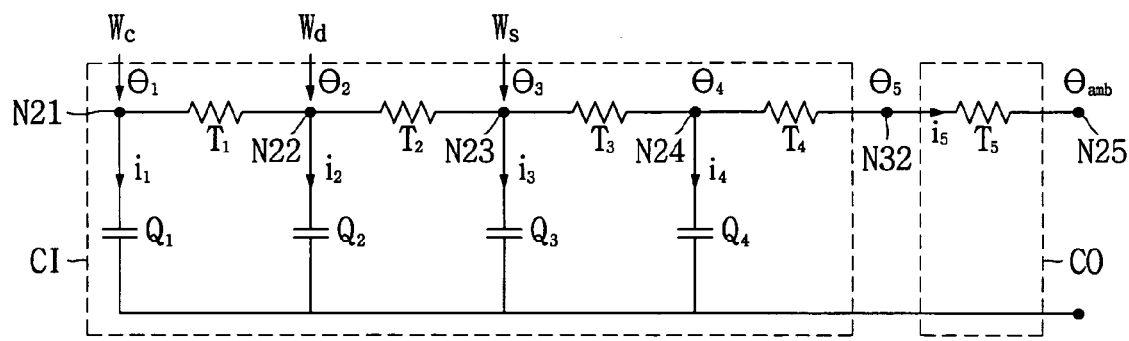
FIGS. 3 and 4 are thermal approximate circuit diagrams of the underground power cable of FIG. 2.

FIG. 3 is a circuit diagram approximately showing heat transfer between each component of the link 20 (or, the electric power cable) and the soil 10 around the link 20, in which CI and CO mean inside and outside of the cable respectively. In the circuit diagram, nodes N21, N22, N23, N24, N32 and N25 respectively designate the conductor 21, the insulation layer 22, the sheath 23, the surface of the cable or the sheath, the distributed temperature sensor 32 and a region of the soil 10 around the link 20 influenced by the heat generated from the cable. In addition, $\theta_1$ to $\theta_4$, $\theta_e$ and $\theta_{amb}$ respectively denote temperature of each node, $T_1$ to $T_5$ denote thermal resistance between the nodes, $Q_1$ to $Q_4$ denote thermal capacity of the material constituting each node, and $i_1$ to $i_5$ denote heat flow passing through each node. On the other hand, $W_c$, $W_d$ and $W_s$ are heat sources generated in the link 20 as an electric current flows through the link 20, which respectively denote a conductor loss occurring in the conductor 21, a dielectric loss occurring in the insulation layer 22 and a sheath loss occurring in the sheath 23. The conductor loss $W_c$ is determined on the consideration of a Joule loss proportional to a square of conductor resistance and an electric current, a skin effect according to the flow of an alternating current, a proximity effect caused by an adjacent cable, and so on. The sheath loss is determined on the consideration of a sheath circulating current loss and a loss caused by the type of sheath grounding.

Among the values, $Q_1$ to $Q_4$ and $T_1$ to $T_4$ are determined by properties and structure of each material constituting the cable, while $W_c$, $W_d$ and $W_s$ are determined by an electric current flowing through the conductor 21 as well as properties (e.g., a resistance) and structure of each material. The electric current flowing through the link 20, or the conductor 21, may be obtained by either measuring the current with the use of an electric current measuring unit 34 or receiving data related to a present electric current from a power transmission station. In addition, $\theta_e$ is obtained by the aforementioned distributed temperature measuring unit 31.

$\theta_1$ to $\theta_4$ may be obtained by analyzing the thermal approximate circuit of FIG. 3 using the obtained values, similar to the analysis of a general electric circuit. In addition, the heat flows $i_1$ to $i_4$ flowing through each node and the heat flow $i_5$ emitted out of the cable may be obtained using the following equation.

$$i_1 = Q_1 \frac{\Delta\theta_1}{\Delta t},\ i_2 = Q_2 \frac{\Delta\theta_2}{\Delta t},\ i_3 = Q_3 \frac{\Delta\theta_3}{\Delta t},\ i_4 = Q_4 \frac{\Delta\theta_4}{\Delta t} \quad \text{Equation 1}$$
$$i_5 = W_c + W_d + W_s - (i_1 + i_2 + i_3 + i_4)$$

And then, the thermal resistance $T_5$ of the soil 10 around the link is obtained using the following equation.

$$T_5 = \frac{\theta_e - \theta_{amb}}{i_5} \quad \text{Equation 2}$$

Here, the surface distributed temperature $\theta_e$ of the link 20, that is the temperature of the distributed temperature sensor 31, is obtained by the aforementioned distributed temperature measuring unit 31, and the temperature $\theta_{amb}$ of the soil 10 around the link 20 may use a value given by the international standard IEC60287 for an electric power cable (e.g., 25° C. in the temperate region if the cable is directly buried or installed in a duct, and 40° C. in case the cable is installed in a tunnel).

Figure 4:
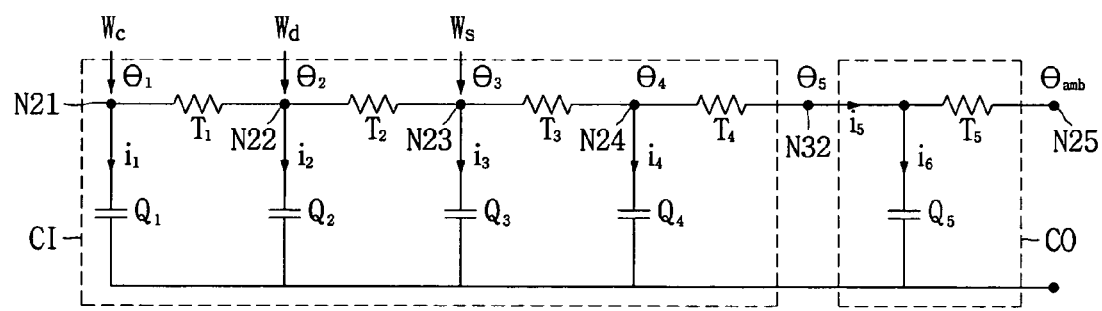

On the other hand, it is also possible to calculate the thermal capacity in real time in addition to, or instead of, the thermal resistance of the soil 10 around the link 20, as shown in FIG. 4.

A thermal approximate circuit diagram of FIG. 4 is different from FIG. 3 in the fact that the thermal capacity $Q_5$ of the soil around the link is added to the circuit diagram of FIG. 3. In the thermal approximate circuit diagram of FIG. 4, the thermal capacity $Q_5$ of the soil 10 around the link 20 is calculated using the following equation 3. In Equation 3, k is a thermal time constant of the soil, namely a time parameter in a function of temperature increase according to time when the temperature of the soil around the link increases as the link 20 is heated. The thermal time constant k is determined depending on geological features of the soil.

$$Q_5 = \frac{i_5}{\frac{d\theta_e}{dt} + \frac{\theta_e - \theta_{amb}}{k}} \quad \text{Equation 3}$$

On the other hand, the thermal resistance $T_5$ and the thermal capacity $Q_5$ of the soil around the link are related as expressed in the following equation.

$$T_s = \frac{k}{Q_5} \quad \text{Equation 5}$$

If the conductor temperature of the link 20 and the thermal parameter of the soil 10 around the link 20 are calculated, the current carrying capacity calculating unit 36 calculates a ampacity acceptable to the link 20 on the basis of such values. In brief, the current carrying capacity may also be simply calculated just based on the conductor temperature or just based on the calculated thermal parameter, as in the conventional cases. Specifically, the relation between the conductor temperature constructed by the operation history of the link for a predetermined period in the past and the ampacity to the link in the future is made into a database for calculating a current carrying capacity for a predetermined period in the future. In case of using the thermal parameter, the current carrying capacity may be calculated in the same manner.

With calculating the current carrying capacity for a predetermined period in the future (preferably for various time periods such as 2 hours, 4 hours, 8 hours, 12 hours, 24 hours, 48 hours, 100 hours and so on), the operation of the link 20 is managed in real time. In other words, while monitoring the conductor temperature and the thermal parameter in real time, the apparatus is operated to make an alarm if the conductor temperature or the thermal resistance approaches or exceeds a predetermined criterion.

Such monitoring, alarm generation and management of the link 20 are preferably conducted through the displaying unit 37 provided in the link status analysis apparatus 30 as shown in FIG. 1. In addition, data such as the surface distributed temperature of the link 20, the conductor temperature, the thermal parameter and the current carrying capacity are preferably accumulated in each item of the database 38. In particular, the link status analysis apparatus of this embodiment should manage a great amount of data because the entire length of the link 20 is monitored for each 1m.

Figure 5:
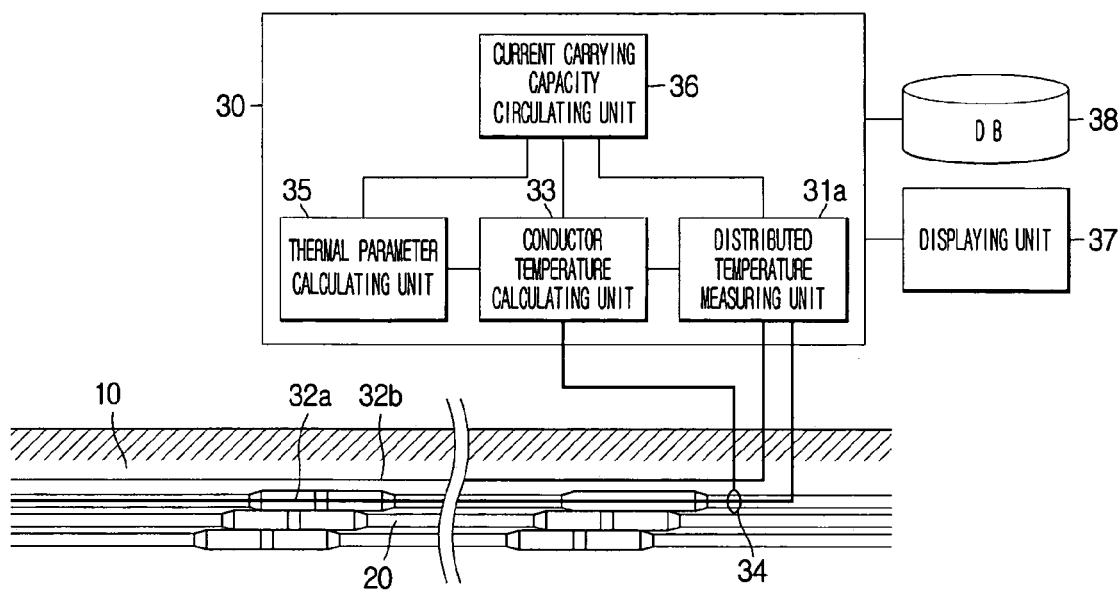
FIG. 5 is a schematic diagram showing an apparatus for analysis of an electric power transmission link status according to another embodiment of the present invention.

FIG. 5 shows a link status analysis apparatus according to another embodiment of the present invention. Now, the link status analysis apparatus of this embodiment is described with reference to FIG. 5, just focused on features and configurations different from the former embodiment.

As shown in FIG. 5, the link status analysis apparatus 30 of this embodiment includes two distributed temperature sensors 32a and 32b in a distributed temperature measuring unit 31a. Here, the first distributed temperature sensor 32a is used for measuring surface distributed temperature of the link 20, identically to the distributed temperature sensor 32 (see FIG. 1) of the former embodiment, while the second distributed sensor (or, an environment distributed temperature sensor) 32b is installed in parallel with the first distributed temperature sensor 32a with being constantly spaced apart from the first distributed temperature sensor 32a. Thus, the second distributed temperature sensor 32b may directly measure the temperature $\theta_{amb}$ (see FIGS. 3 and 4 and Equations 2 and 3) of the soil 10 around the link 20, which enables to obtain a more accurate thermal parameter than the former embodiment.

Figure 6:
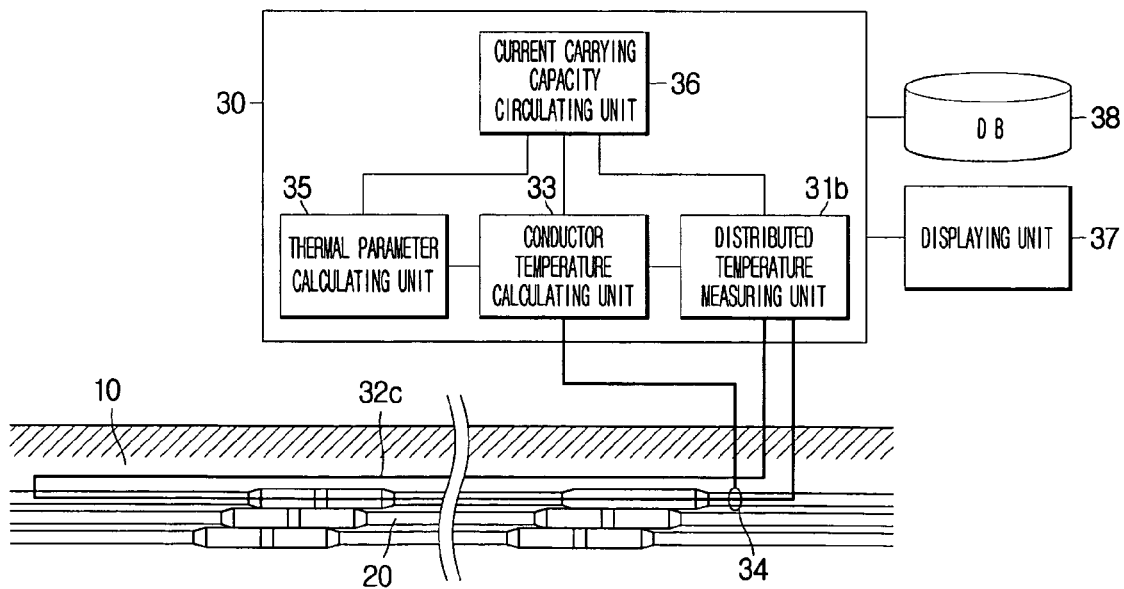
FIG. 6 is a schematic diagram showing an apparatus for analysis of an electric power transmission link status according to still another embodiment of the present invention.

FIG. 6 shows a link status analysis apparatus according to still another embodiment of the present invention. Now, the link status analysis apparatus of this embodiment is described with reference to FIG. 6, just focused on features and configurations different from the former embodiment.

As shown in FIG. 6, the link status analysis apparatus 30 of this embodiment includes a distributed temperature sensor 32c forming a loop which is connected to a distributed temperature measuring unit 31b. One side of the loop (i.e., the distributed temperature sensor) 32c is used for measuring surface distributed temperature of the link 20, identically to the distributed temperature sensor 32 or 32b (see FIG. 1 or 5) of the former embodiments, while the other side of the loop 32c is installed in parallel with one side of the loop 32c with being constantly spaced apart from the loop 32c. Thus, the other side of the loop 32c may directly measure the temperature $\theta_{amb}$ (see FIGS. 3 and 4 and Equations 2 and 3) of the soil 10 around the link 20, which enables to obtain a more accurate thermal parameter than the former embodiment.

On the other hand, though it is depicted and described in the embodiments that the link 20 is directly buried under the ground, the same principle and configuration may be applied to the case that the link 20 is installed in a duct or a tunnel.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

According to the present invention, it is possible to manage operating conditions of an electric power transmission link more accurately since thermal parameters of environment around the link is calculated in real time, thereby preventing any critical accident which may occur when the change of the thermal parameter of the environment is not suitable reflected.

The present invention also ensures safety and efficiency of the link at once since the thermal parameters of the soil around the underground electric power transmission link may be displayed to an operator of the link.

What is claimed is:

1. An apparatus for analysis of an electric power transmission link status comprising:
   a distributed temperature measuring unit installed along a longitudinal direction of an electric power transmission link directly buried or installed in a duct or a tunnel for obtaining a longitudinal distributed temperature from a distributed temperature sensor in real time;
   a conductor temperature calculating unit for calculating a conductor temperature of the electric power transmission link on the basis of the distributed temperature obtained by the distributed temperature measuring unit and an electric current flowing through the electric power transmission link; and
   an external thermal parameter calculating unit for calculating a heat flow emitted out of the electric power transmission link on the basis of the distributed temperature obtained by the distributed temperature measuring unit and the conductor temperature calculated by the conductor temperature calculating unit, and then calculating a thermal parameter of an external environment around the electric power transmission link in real time on the basis of the heat flow emitted out of the electric power transmission link.

2. An apparatus for analysis of an electric power transmission link status according to claim 1, wherein the external thermal parameter calculating unit calculates a thermal resistance of the external environment around the electric power transmission link on the basis of the heat flow, the distributed temperature and a temperature of the external environment around the electric power transmission link.

3. An apparatus for analysis of an electric power transmission link status according to claim 1, wherein the external thermal parameter calculating unit calculates a thermal capacity of the external environment around the electric power transmission link on the basis of the heat flow, the distributed temperature, a temperature of the external environment around the electric power transmission link and a thermal time constant of the external environment around the electric power transmission link.

4. An apparatus for analysis of an electric power transmission link status according to claim 2 or 3,
wherein the distributed temperature sensor is an optical fiber distributed temperature sensor, and includes a first distributed temperature sensor installed along the longitudinal direction of the electric power transmission link and a second distributed temperature sensor installed under the ground in parallel with and constantly spaced from the first distributed temperature sensor,
wherein the first distributed temperature sensor measures the distributed temperature, and the second distributed temperature measures the temperature of the external environment around the electric power transmission link.

5. An apparatus for analysis of an electric power transmission link status according to claim 2 or 3,
wherein the distributed temperature sensor is an optical fiber distributed temperature sensor forming a loop of which one side is installed along the longitudinal direction of the electric power transmission link and the other side is installed under the ground in parallel with and constantly spaced apart from the one side,
wherein the distributed temperature is measured at one side of the loop, and the temperature of the external environment around the electric power transmission link is measured at the other side of the loop.

6. An apparatus for analysis of an electric power transmission link status according to claim 1, further comprising a current carrying capacity calculating unit for calculating an ampacity which the electric power transmission link is capable of flowing for a predetermined time on the basis of the conductor temperature calculated by the conductor temperature calculating unit and the thermal parameter calculated by the external thermal parameter calculating unit.

7. An apparatus for analysis of an electric power transmission link status according to claim 1, further comprising a current carrying capacity calculating unit for calculating an ampacity which the electric power transmission link is capable of flowing for a predetermined time on the basis of the conductor temperature calculated by the conductor temperature calculating unit.

8. An apparatus for analysis of an electric power transmission link status according to claim 1, further comprising a thermal parameter displaying unit for displaying the thermal parameter calculated by the external thermal parameter calculating unit in real time.

9. An apparatus for analysis of an electric power transmission link status according to claim 1, further comprising a conductor temperature displaying unit for displaying the conductor temperature calculated by the conductor temperature calculating unit in real time.

10. An apparatus for analysis of an electric power transmission link status according to claim 1, further comprising an electric current measuring unit for measuring an electric current flowing through the electric power transmission link.

11. A method for analysis of an electric power transmission link status comprising the steps of:
(a) measuring a surface distributed temperature of the electric power transmission link in real time by using a distributed temperature sensor installed along a longitudinal direction of the electric power transmission link directly buried or installed in a duct or a tunnel;
(b) calculating a conductor temperature of the electric power transmission link on the basis of the surface distributed temperature and an electric current flowing through the electric power transmission link;
(c) calculating a heat flow emitted out of the electric power transmission link on the basis of the surface distributed temperature and the conductor temperature; and
(d) calculating a thermal parameter of an external environment around the electric power transmission link in real time on the basis of the heat flow emitted out of the electric power transmission link.

12. A method for analysis of an electric power transmission link status according to claim 11, wherein the step (d) calculates a thermal resistance of the external environment around the electric power transmission link on the basis of the heat flow, the surface distributed temperature and a temperature of the external environment around the electric power transmission link.

13. A method for analysis of an electric power transmission link status according to claim 12,
wherein the step (d) calculates the thermal resistance T by using the following equation:

$$T = \frac{\theta_e - \theta_{amb}}{i}$$

where $\theta_e$ is the surface distributed temperature, $\theta_{amb}$ is the temperature of the external environment around the electric power transmission link, and i is the heat flow.

14. A method for analysis of an electric power transmission link status according to claim 11, wherein the step (d) calculates a thermal capacity of the external environment around the electric power transmission link on the basis of the heat flow, the surface distributed temperature, a temperature of the external environment around the electric power transmission link and a thermal time constant of the external environment around the electric power transmission link.

15. A method for analysis of an electric power transmission link status according to claim 14,
wherein the step (d) calculates the thermal capacity Q by using the following equation:

$$Q = \frac{i}{\frac{d\theta_e}{dt} + \frac{\theta_e - \theta_{amb}}{k}}$$

where $\theta_e$ is the surface distributed temperature, $\theta_{amb}$ is the temperature of the external environment around the electric power transmission link, i is the heat flow, and k is the thermal time constant.

16. A method for analysis of an electric power transmission link status according to claim 12 or 14, wherein the temperature of the external environment around the electric power transmission link is measured by an environment distributed temperature sensor installed under the ground in parallel with and constantly spaced apart from the distributed temperature sensor.

17. A method for analysis of an electric power transmission link status according to claim 12 or 14,
wherein the distributed temperature sensor is an optical fiber distributed temperature sensor forming a loop of which one side is installed along the longitudinal direction of the electric power transmission link and the other side is installed under the ground in parallel with and constantly spaced apart from the one side,
wherein the surface distributed temperature is measured at one side of the loop, and the temperature of the external environment around the electric power transmission link is measured at the other side of the loop.

18. A method for analysis of an electric power transmission link status according to claim 11, further comprising the step of calculating an electric current which the electric power transmission link is capable of flowing for a predetermined time on the basis of the conductor temperature and the thermal parameter.

19. A method for analysis of an electric power transmission link status according to claim 11, further comprising the step of calculating an electric current which the electric power transmission link is capable of flowing for a predetermined time on the basis of the conductor temperature.

* * * * *